United States Patent [19]

Jones et al.

[11] Patent Number: 5,643,862
[45] Date of Patent: Jul. 1, 1997

US005643862A

[54] STABLE FOAM-CONTROLLED LIQUID DETERGENT COMPOSITIONS

[75] Inventors: Roger Jeffery Jones, Jauche; Athanasios Surutzidis, Wemmel; Walter Broeckx, Zele; Andrew Albon Fisk, Strombeek-Bever, all of Belgium

[73] Assignee: The Procter & Gamble Company, Cincinnati, Ohio

[21] Appl. No.: 351,270

[22] PCT Filed: Jun. 4, 1993

[86] PCT No.: PCT/US93/05221

§ 371 Date: Dec. 5, 1994

§ 102(e) Date: Dec. 5, 1994

[87] PCT Pub. No.: WO93/25652

PCT Pub. Date: Dec. 23, 1993

[30] Foreign Application Priority Data

Jun. 6, 1992 [EP] European Pat. Off. .............. 92201649

[51] Int. Cl.⁶ .................. C11D 1/08; C11D 3/12
[52] U.S. Cl. .............. 510/466; 252/321; 252/358; 510/521; 510/525
[58] Field of Search ............ 252/174.15, 174.21, 252/321, 358, 174.25; 510/310, 358, 466, 521, 525

[56] References Cited

U.S. PATENT DOCUMENTS

| | | | |
|---|---|---|---|
| 3,784,479 | 1/1974 | Keil | 252/358 |
| 3,984,347 | 10/1976 | Keil | 252/321 |
| 4,005,044 | 1/1977 | Raleigh | 252/358 |
| 4,021,365 | 5/1977 | Sinka et al. | 252/321 |
| 4,076,648 | 2/1978 | Rosen | 252/358 |
| 4,274,977 | 6/1981 | Koerner et al. | 252/358 |
| 4,639,489 | 1/1987 | Aizawa et al. | 524/588 |
| 4,749,740 | 6/1988 | Aizawa et al. | 524/588 |
| 4,978,471 | 12/1990 | Starch | 252/174.15 |
| 4,983,316 | 1/1991 | Starch | 252/174.15 |
| 5,262,088 | 11/1993 | Hill et al. | 252/321 |
| 5,288,431 | 2/1994 | Huber et al. | 252/548 |

FOREIGN PATENT DOCUMENTS

| | | | |
|---|---|---|---|
| 677355 | 7/1966 | Belgium . | |
| 0046342 | 2/1982 | European Pat. Off. . | |
| 0 091 802 A1 | 10/1983 | European Pat. Off. | C11D 3/00 |
| 0091802 | 10/1983 | European Pat. Off. . | |
| 0142910 | 5/1985 | European Pat. Off. . | |
| 0 163 398 A1 | 12/1985 | European Pat. Off. | C11D 3/00 |
| 0 217 501 A2 | 4/1987 | European Pat. Off. | B01D 19/04 |
| 0333608 | 9/1989 | European Pat. Off. . | |
| 341 952 A | 11/1989 | European Pat. Off. | B01D 19/04 |
| 0 549 232 A1 | 6/1993 | European Pat. Off. | C11D 3/37 |
| WO93/25652 | 12/1993 | WIPO | C11D 3/37 |

*Primary Examiner*—Paul Lieberman
*Assistant Examiner*—Kery A. Fries
*Attorney, Agent, or Firm*—George W. Allen; Robert B. Aylor

[57] ABSTRACT

The present invention provides an antifoam agent for inclusion in a detergent composition in liquid form, comprising a silicone antifoam compound, a surfactant-containing solution and a particulate stabilizing aid. The present invention also provides detergent compositions comprising said antifoam agent.

7 Claims, No Drawings

STABLE FOAM-CONTROLLED LIQUID DETERGENT COMPOSITIONS

TECHNICAL FIELD

The present invention relates to stable liquid detergents comprising silicone antifoam agents.

More in particular, the present invention relates to stable foam controlled liquid detergents comprising silicone antifoam compounds and particulate stabilizing aids.

BACKGROUND

It has become common practice in the detergent industry to include in detergent compositions materials which are intended to control the amount of foam produced during a washing cycle in a washing machine.

Indeed, excessive sudsing has been found to interfere negatively with the action of the wash liquor upon the fabrics.

Silicone antifoam agents in finely dispensed form have been found to be particularly effective species, and efforts have been directed to increase the stability of such agents upon prolonged storage in a liquid detergent composition containing them.

In U.S. Pat. No. 4,798,671, it has been proposed to make a premix of dispensing agents and suds controlling agents to obtain storage benefits. However, it is extremely difficult to create and maintain the finely dispersed form in liquid detergent compositions and especially in the presence of high ionic strengths.

Surprisingly, it has now been found that improved storage stability of silicone antifoam compounds can be achieved by adding low levels of a particulate stabilizing aid.

According to the present invention, an antifoam agent is provided which has improved stability upon storage when incorporated in liquid detergents.

According to one embodiment, a stable liquid detergent composition comprising said antifoam agent is provided.

According to another embodiment, a process is provided to obtain a stable liquid detergent composition comprising said antifoam agent.

SUMMARY OF THE INVENTION

The present invention provides antifoaming agents for inclusion in detergent compositions in liquid form, said antifoam agent comprising a silicone antifoam compound, a surfactant-containing solution, a particulate stabilizing aid and optionally a dispersant.

The present invention also provides detergent compositions containing a surface-active agent, said antifoam agent, and optionally other detergent ingredients.

DETAILED DESCRIPTION OF THE INVENTION

The silicone antifoam compound

The silicone antifoam compound is present in the antifoam agent of the present invention, at levels of from 0.1% to 80% by weight, preferably 5% to 80% by weight.

In industrial practice, the term "silicone" has become a generic term which encompasses a variety of relatively high-molecular weight polymers containing siloxane units and hydrocarbyl groups of various types. Generally, the silicone suds controllers can be described as siloxanes having the general structure:

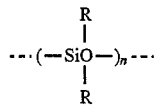

wherein n is from 20 to 2,000, and where each R independently can be an alkyl or an aryl radical. Examples of such substituents are methyl, ethyl, propyl, isobutyl, and phenyl. Preferred polydiorganosiloxanes are polydimethylsiloxanes having trimethylsilyl endblocking units and having a viscosity at 25° C. of from $5\times10^{-5}$ m$^2$/s to 0.1 m$^2$/s i.e. a value of n in the range 40 to 1500. These are preferred because of their ready availability and their relatively low cost.

A preferred type of silicone antifoam agent useful in the compositions herein comprises a mixture of an alkylated siloxane of the type hereinabove disclosed and solid silica.

The solid silica can be a fumed silica, a precipitated silica or a silica made by the gelformation technique. The silica particles can be rendered hyrophobic by treating them with diaklylsilyl groups and/or trialkylsilane groups either bonded directly onto the silica or by means of silicone resin. A preferred antifoam compound comprises a hydrophobic silanated, most preferably trimethylsilanated silica having a particle size in the range from 10 mm to 20 mm and a specific surface area above 50 m$^2$/g.

Silicone antifoams employed in a foam control agent according to this invention suitably have an amount of silica in the range of 1 to 30% (more preferably 2.0 to 15%) by weight of the total weight of the silicone antifoam resulting in silicone antifoams having an average viscosity in the range of from $2\times10^{-4}$ m$^2$/s to 1 m$^2$/s.

Preferred silicone antifoams may have a viscosity in the range of from $5\times10^{-3}$ m$^2$/s to 0.1 m$^2$/s.

Particularly suitable are silicone antifoams with a viscosity of $2\times10^{-2}$ m$^2$/s or $4.5\times10^{-2}$ m$^2$/s.

Typically, when high viscosity type of silicones or branched silicones are employed for use as silicone antifoam compound in the present invention, the level of the silicone antifoam compound is from 40% to 80% by weight of the antifoam agent.

The surfactant-containing solution

The antifoam agent of the present invention further comprises as a water-soluble or water-dispersable organic carrier a surfactant-containing solution.

The surfactant containing solution comprise a surfactant which can be selected from nonionic and/or anionic and/or cationic and/or ampholytic and/or zwitterionic and/or semi-polar surfactants.

Preferred surfactant-containing solutions to be used according to the present invention comprise as a surfactant one or more of the nonionic surfactants described herein.

NONIONIC

Polyethylene, polypropylene, and polybutylene oxide condensates of alkyl phenols are suitable for use as the nonionic surfactant of the surfactant-containing solution of the present invention, with the polyethylene oxide condensates being preferred. These compounds include the condensation products of alkyl phenols having an alkyl group containing from about 6 to about 14 carbon atoms, preferably from about 8 to about 14 carbon atoms, in either a straight-chain or branched-chain configuration with the alkylene oxide. In a preferred embodiment, the ethylene oxide is present in an amount equal to from about 5 to about 25 moles, more preferably from about 3 to about 15 moles, of ethylene oxide per mole of alkyl phenol. Commercially available nonionic surfactants of this type include Igepal™

CO-630, marketed by the GAF Corporation; and Triton™ X-45, X-114, X-100 and X-102, all marketed by the Rohm & Haas Company. These surfactants are commonly referred to as alkylphenol alkoxylates (e.g., alkyl phenol ethoxylates).

The condensation products of primary and secondary aliphatic alcohols with from about 1 to about 25 moles of ethylene oxide are suitable for use as the nonionic surfactant of the surfactant containing solutions of the present invention. The alkyl chain of the aliphatic alcohol can either be straight or branched, primary or secondary, and generally contains from about 8 to about 22 carbon atoms. Preferred are the condensation products of alcohols having an alkyl group containing from about 8 to about 20 carbon atoms, more preferably from about 10 to about 18 carbon atoms, with from about 2 to about 10 moles of ethylene oxide per mole of alcohol. Examples of commercially available nonionic surfactants of this type include Tergitol™ 15-S-9 (the condensation product of $C_{11}$–$C_{15}$ linear alcohol with 9 moles ethylene oxide), Tergitol™ 24-L-6 NMW (the condensation product of $C_{12}$–$C_{14}$ primary alcohol with 6 moles ethylene oxide with a narrow molecular weight distribution), both marketed by Union Carbide Corporation; Neodol™ 45-9 (the condensation product of $C_{14}$–$C_{15}$ linear alcohol with 9 moles of ethylene oxide), Neodol™ 23-6.5 (the condensation product of $C_{12}$–$C_{13}$ linear alcohol with 6.5 moles of ethylene oxide), Neodol™ 45-7 (the condensation product of $C_{14}$–$C_{15}$ linear alcohol with 7 moles of ethylene oxide), Neodol™ 45-4 (the condensation product of $C_{14}$–$C_{15}$ linear alcohol with 4 moles of ethylene oxide) marketed by Shell Chemical Company, and Kyro™ EOB (the condensation product of $C_{13}$–$C_{15}$ alcohol with 9 moles ethylene oxide), marketed by The Procter & Gamble Company.

Also useful as the nonionic surfactant of the surfactant-containing solution of the present invention are the alkylpolysaccharides disclosed in U.S. Pat. No. 4,565,647.

Also suitable for use as the nonionic surfactant of the surfactant-containing solution of the present invention, are the condensation products of ethylene oxide with the product resulting from the reaction of propylons oxide and ethylenediamine. The hydrophobic moiety of these products consists of the reaction product of ethylenediamine and excess propylons oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic™ compounds, marketed by BASF.

Preferred for use as the nonionic surfactant of the surfactant-containing solution of the present invention are polyethylene oxide condensates of alkyl phenols, condensation products of primary and secondary aliphatic alcohols with from about 1 to about 25 moles of ethylene oxide, alkylpolysaccharides, and mixtures thereof. Most preferred are $C_8$–$C_{14}$ alkyl phenol ethoxylates having from 3 to 15 ethoxy groups and $C_8$–$C_{18}$ alcohol ethoxylates (preferably $C_{10}$ avg.) having from 2 to 10 ethoxy groups, and mixtures thereof.

Also suitable as nonionic surfactants are polyhydroxy fatty acid amide surfactants of the formula

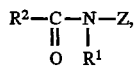

wherein $R^1$ is H, or $R^1$ is $C_{1-4}$ hydrocarbyl, 2-hydroxy ethyl, 2-hydroxy propyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is a straight $C_{11-15}$ alkyl or alkenyl chain such as coconut alkyl or mixtures thereof, and Z is derived from a reducing sugar such as glucose, fructose, maltose, lactose, in a reductive amination reaction.

Especially suitable nonionic surfactants are 2-alkyl-alcanols. Exemplary 2-alkyl-alcanols are 2-butyl-alcanols which are commercially available under the tradename Isofol 12R.

Suitable anionic surfactants to be used are alkyl ester sulfonate surfactants including linear esters of $C_8$–$C_{20}$ carboxylic acids (i.e. fatty acids).

The preferred alkyl ester sulfonate surfactant, especially for laundry applications, comprise alkyl ester sulfonate surfactants of the structural formula:

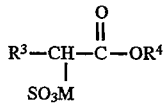

wherein $R^3$ is a $C_8$–$C_{20}$ hydrocarbyl, preferably an alkyl, or combination thereof, $R^4$ is a $C_1$–$C_6$ hydrocarbyl, preferably an alkyl, or combination thereof, and M is a cation which forms a water soluble salt with the alkyl ester sulfonate. Suitable salt-forming cations include metals such as sodium, potassium, and lithium, and substituted or unsubstituted ammonium cations, such as monoethanolamine, diethanolamine, and triethanolamine. Preferably, $R^3$ is $C_{10}$–$C_{16}$ alkyl, and $R^4$ is methyl, ethyl or isopropyl. Especially preferred are the methyl ester sulfonates wherein $R^3$ is $C_{10}$–$C_{16}$ alkyl.

Other suitable anionic surfactants include the alkyl sulfate surfactants hereof are water soluble salts or acids of the formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g., an alkali metal cation (e.g. sodium, potassium, lithium), or ammonium or substituted ammonium (e.g. methyl-, dimethyl-, and trimethyl ammonium cations and quaternary ammonium cations such as tetramethyl-ammonium and dimethyl piperdinium cations and quaternary ammonium cations derived from alkylamines such as ethylamine, diethylamine, triethylamine, and mixtures thereof, and the like).

Alkyl alkoxylated sulfate surfactants hereof are water soluble salts or acids of the formula $RO(A)_mSO3M$ wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl, trimethyl-ammonium cations and quaternary ammonium cations such as tetramethyl-ammonium and dimethyl piperdinium cations and those derived from alkylamines such as ethylamine, diethylamine, triethylamine, mixtures thereof, and the like. Exemplary surfactants are $C_{12}$–$C_{18}$ alkyl polyethoxylate (1.0) sulfate ($C_{12}$–$C_{18}$E(1.0)M), $C_{12}$–$C_{18}$ alkyl polyethoxylate (2.25) sulfate ($C_{12}$–$C_{18}$E(2.25)M), $C_{12}$–$C_{18}$ alkyl polyethoxylate (3.0) sulfate ($C_{12}$–$C_{18}$E(3.0)M), and $C_{12}$–$C_{18}$ alkyl polyethoxylate (4.0) sulfate ($C_{12}$–$C_{18}$E(4.0)M), wherein M is conveniently selected from sodium and potassium.

Other anionic surfactants useful to serve as a surfactant for the surfactant-containing solution include salts (including, for example, sodium, potassium, ammonium, and substituted ammonium salts such as mono-, di- and triethanolamine salts) of soap, $C_9$–$C_{20}$ linear alkylbenzenesulfonates, $C_8$–$C_{22}$ primary of secondary alkanesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl glycerol sulfonates, fatty acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinates (especially saturated and unsaturated $C_{12}$–$C_{18}$ monoesters) and diesters of sulfosuccinates (especially saturated and unsaturated $C_6$–$C_{12}$ diesters), acyl sarcosinates, sulfates of alkylpolysaccharides such as the sulfates of alkylpolyglucoside (the nonionic nonsulfated compounds being described below), branched primary alkyl sulfates, and alkyl polyethoxy carboxylates such as those of the formula $RO(CH_2CH_2O)_k$—$CH_2COO$—$M+$ wherein R is a $C_8$–$C_{22}$ alkyl, k is an integer from 0 to 10, and M is a soluble salt-forming cation. Resin acids and hydrogenated resin acids are also suitable, such as rosin, hydrogenated rosin, and resin acids and hydrogenated resin acids present in or derived from tall oil. Further examples are described in "Surface Active Agents and Detergents" (Vol. I and II by Schwartz, Perry' and Berch). A variety of such surfactants are also generally disclosed in U.S. Pat. No. 3,929,678, issued Dec. 30, 1975 to Laughlin, et el. at Column 23, line 58 through Column 29, line 23.

Cationic detersive surfactants suitable for use in the surfactant-containing solution are those having one long-chain hydrocarbyl group. Examples of such cationic surfactants include the ammonium surfactants such as alkyldimethylammonium halogenides, and those surfactants having the formula:

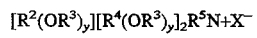

[$R^2(OR^3)_y$][$R^4(OR^3)_y$]$_2R^5N+X^-$ wherein $R^2$ is an alkyl or alkyl benzyl group having from about 8 to about 18 carbon atoms in the alkyl chain, each $R^3$ is selected from the group consisting of —$CH_2CH_2$—, —$CH_2CH(CH_3)$—, —$CH_2CH(CH_2OH)$—, —$CH_2CH_2CH_2$—, and mixtures thereof; each $R^4$ is selected from the group consisting of $C_1$–$C_4$ alkyl, $C_1$–$C_4$ hydroxyalkyl, benzyl ring structures formed by joining the two $R^4$ groups, —$CH_2CHOH$—$CHOHCOR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Other cationic surfactants useful herein are also described in U.S. Pat. No. 4,228,044.

Ampholytic surfactants are also suitable for use in the surfactant-containing solution of the present invention. These surfactants can be broadly described as aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g. carboxy, sulfonate, sulfate. See U.S. Pat. No. 3,929,678.

Zwitterionic surfactants are also suitable for use in the surfactant-containing solution of the present invention. These surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678.

Semi-polar nonionic surfactants are a special category of nonionic surfactants which include water-soluble amine oxides containing one alkyl moiety of from about 10 to about 18 carbon atoms and 2 moieties selected from the group consisting of alkyl groups and hydroxyalkyl groups containing from about 1 to about 3 carbon atoms; water-soluble phosphine oxides containing one alkyl moiety of from about 10 to about 18 carbon atoms and 2 moieties selected from the group consisting of alkyl groups and hydroxyalkyl groups containing from about 1 to about 3 carbon atoms; and water-soluble sulfoxides containing one alkyl moiety of from about 10 to about 18 carbon atoms and a moiety selected from the group consisting of alkyl and hydroxyalkyl moieties of from about 1 to about 3 carbon atoms.

Semi-polar nonionic detergent surfactants include the amine oxide surfactants having the formula

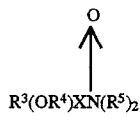

$$R^3(OR^4)_xN(R^5)_2$$

wherein $R^3$ is an alkyl, hydroxyalkyl, or alkyl phenyl group or mixtures therof containing from about 8 to about 22 carbon atoms; $R^4$ is an alkylene or hydroxyalkylene group containing from about 2 to about 3 carbon atoms or mixtures thereof; x is from 0 to about 3; and each $R^5$ is an alkyl or hydroxyalkyl group containing from about 1 to about 3 carbon atoms or a polyethylene oxide group containing from about 1 to about 3 ethylene oxide groups. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{12}$ alkoxy ethyl dihydroxy ethyl amine oxides.

When included therein, the surfactant containing solution of the present invention typically comprise from 20% to 100% by weight of surfactants. Typically, the weight ratio of the surfactant-containing solution to the silicone antifoam compound is present in the antifoam agent from 1:4 to 1000:1, preferably from 1:4 to 80:1, most preferably from 1:4 to 20:1.

Particulate stabilizing aid

The antifoam agent according to the present invention further comprises a particulate stabilizing aid.

The particulate stabilizing aid according to the present invention is a moderately hydrophobic particulate stabilizing aid wherein the particulate is a very fine particle size silica. Typically the stabilizing aid of the present invention is silica and is of the fumed or precipitated types but not limited to this type, having a B.E.T. surface area preferably from 50 to 500 square meters per gram, the surface of which has been incompletely treated with hydrophobing agents.

One important measure of the hydrophobing treatment level is the analysis of bound carbon on the silica. When this is viewed with repect to the total surface area of the material, the milligrams of carbon per square meter of surface area can be calculated. It should be noted that the type of carbon deposited on the surface and its distribution on the surface will have a major impact on the level of hydrophobicity. A more objective measure of treatment level is determined using the Methanol Wettability test. This is a standard test known in the industry which measures the volume percent of methanol in water needed to just wet the silica. Silicas that are wettable by solutions containing less methanol are more hydrophilic, those requiring more methanol are more hydrophobic.

Highly preferred silica particles are fumed nonporous silica. For example, a fumed nonporous silica for the present invention is Aerosil® R 972 (fumed silica that has been treated to a moderate level with dichlorodimethylsilane, having about 110 $m^2/g$ BET surface area, Degussa Corporation, Ridgefield Park, N.J.). This material is prepared from a fumed silica having surface area of 130 $m^2/g$. The silica is treated with dimethyldichlorosilane at about 500° C. with the treating level being controlled to provide less than complete methylation of the surface. In the case of Aerosil® R 972 it is estimated that 70% of the surface hydroxyl groups present on the original silica have been methylated leaving approximately 30% untreated. The untreated hydroxyls are hydrophilic and are capable of hydrogen bonding with polar substances such as water. The alkylated portion of the surface is non-polar in nature and hydrophobic. A controlled level of treatment will provide a moderately treated silica with a balance between the hydrophobic alkylated surface and the hydrophilic untreated surface. Particulates having a controlled level of hydrophobic treatment prior to utilization are preferred as particulate stabilizing aid.

Any of several known treating methods may be employed in prior treatment of the silica for use as a particulate stabilizing aid.

For example in a preferred embodiment fumed silica can be treated with dimethyldichlorosilane to affix dimethylsilane groups on the surface of the silica. The hydrophobing agents herein are any of those well known to the art which provide organosilyl reaction products bound to the silica surface. Common examples of hydrophobing agents are silanes, siloxanes, or silazanes. Thus, modification is carried out by procedures well known to the art, for example, by reaction of the silica surface with trialkylchlorosilane, dialkyldichlorosilane, octaalkylcyclotetrasiloxane, or hexaalkyldisilazane, or hexaalkyltrisilazane under suitable conditions. Hydrophobing agents such as polydimethylsiloxane are not preferred for this invention unless special care is taken to limit the amount of hydrophobic material placed on the silica surface and its distribution.

It is preferred that for the compositions of the present invention that the particulate stabilizing aid be a silica whose surface has been hydrophobically modified such that it has a Methanol Wettability of from 30 to 70 percent. It is highly preferred in the present invention that the particulate stabilizing aid have a Methanol Wettability of from 35 to 55 percent.

Other characteristics of the silica for use as a particulate stabilizing aid are hypothesized to have influencing factors on their relative utility as stabilizing aids. Without limiting the present invention to any particular theory, it is believed that the physical and chemical makeup of the solid's surface is important to the utility of the particulates in the present invention in that it controls the wetting behavior of the solid. Thus, in addition to having a controlled level of surface treatment, the uniformity of distribution of the hydrophobic materials on the surface and the surface roughness and porosity of the solid is thought to impact wetting behavior, especially wetting hysteresis.

The manner in which the particulates are assembled is also thought to influence their utility. For example, silicas are thought to consist of primary particles linked together into aggregates which are assembled into agglomerates through physical interactions. Breakup of agglomerates into smaller particles may be one component in the relative efficiency of the particulate stabilization and should be a component of processing optimization.

Typically, the weight ratio of the particulate stabilizing aid to the silicone antifoam compound present in the antifoam agent is from 1:200 to 1:1, preferably from 1:20 to 1:3.3, most preferably from 1:20 to 1:6.6.

The antifoam compounds, as described hereinabove, must be present in the liquid detergent compositions in finely dispersed form in order to be effective. However, the particles of the antifoam agent present in the liquid detergent composition tend to coagulate upon storage, thereby becoming less efficient antifoam agents.

According to the present invention, it has been found that improved stability of the antifoam compounds can be achieved by adding a particulate stabilizing aid to the antifoam compounds. The concept of "stability" as used herein is in the context of maintaining the antifoam agent in finely dispersed form.

The addition of low levels of said particulate stabilizing aid reduces the coalescence of the antifoam particles so that stable detergent formulas can be prepared.

In addition, it has been found that the antifoam agents according to the present invention is readily dispersed in the detergent matrix without the need for a dispersant.

In terms of processing, the antifoam agents of the present invention are made by premixing the surfactant-containing solution and the particulate stabilizing aid in a high shear mixer. The high shear mix can be prepared using any conventional high shear mixing equipment.

The antifoam compound can be added to said premix as such or as a mixture with detergent ingredients. The resulting composition can thereafter be mixed using a high shear mixer. In one proces aspect of the present invention, the process for making the foam controlling agent according to the present invention comprises the steps of:

(a) premixing the surfactant-containing solution with the particulate stabilizing aid in a weight ratio of 100.000:1 to 4:1, preferably of 2000:1 to 4:1, more preferably of 10:1 to 4:1.

(b) admixing said premix to the silicone antifoam compound wherein the weight ratio of the premix to the silicone antifoam compound is from 1000:1 to 1:4, preferably from 20:1 to 1:4, more preferably from 15:1 to 1:4.

The foam-controlled liquid detergent compositions comprising the antifoam agent of the present invention is made by adding the premix and the antifoam compound to the detergent ingredients typically by mixing such as high shear mixing.

The liquid detergent compositions comprising the antifoam agent can be provided having various ratios and proportions of the antifoam agents. The amount of antifoam agents can be varied, depending upon the suds profile desired by the formulation. The level of antifoam agent is present from 0.001 to 100% by weight of the total detergent composition. Typically, the level of antifoam agent is present by 0.01 to 20%, preferably from 0.01 to 10% by weight of the detergent composition.

The antifoam agents of the present invention can also be incorporated in detergent additive products. Such additive products are intended to supplement or boost the performance of conventional detergent compositions and may contain any of the components of such compositions.

Dispersant

The suds contolling composition of the present invention comprises optionally a dispersing agent.

The dispersing agent disperses or helps disperse the silicone suds control agent uniformly so that stable, preferably homogeneous, detergent formulas can be prepared. The dispersing agent is premixed with the antifoam agent prior to incorporation into the liquid detergent composition.

Suitable dispersing agents include materials such as ethylene oxide adducts of linear or arylphenols having from 8 to 20 carbon atoms per molecule, such as lauryl polyoxethylene glycol ether, stearyl polyoxyethylene, glycol ether, cetyl polyoxyethylene glycol ether, and nonylphenol polyoxyethylene glycol ether, and also ethylene oxide adducts of linear or branched monocarboxylic acids and having HLBs of greater than about 13.5, preferably greater than about 14. Preferably, such addition products have short hydrophylic chains containing 12 or preferably less carbon atoms and from about 8 to about 15 ethylene oxide units per molecule. Other examples of preferred dispersants are polyoxyethylene glycol sorbitan esters of polyoxyethylene glycol sorbital esters having HLB values of 14 or more, such as polyoxyethylene glycol sorbitan hexaoleate or polyoxyethylene sorbitol hexaoleate. Additional examples of preferred dispersants are fatty acid nono-,di-, and/or polyglycerides and sodium or calcium stearoyl lactate, diglycerol stearate, and sorbitan monostearate. The antifoam agnet of the present invention can contain a single type of dispersant or mixtures of at least two different types of dispersants.

Other useful dispersants are commercial oxyethylated polyhydric alcohols or their derivatives or similar compounds having an active hydrogen atom, as well as fatty acid esters of glycerol or sorbitol.

Anionic emulsifiers, such as sodium dodecylbenzenesulphonate or sodium laurylsulphate, can also be used, but preferably with a solvent.

Preferred is an emulsifier mixture of oxyethylated fatty alcohol and oxyethylated triglyceride having an HLB value preferably in the range from about 14 to 16.

The preferred solvent for dimethylpolysiloxane is pentameric cyclomethicone. Particularly preferred dispersants for use herein are cyclomethicone and $C_9$–$C_{11}$ linear chain alcohols ethoxylated with from about 7 to about 10 moles of ethylene oxide per mole of alcohol especially when the unreacted alcohol and monoethoxylated alcohol are removed and mixtures thereof. If added to the antifoam agent of the present invention, the weight ratio of dispersant to the silicone antifoam compound is typically from 1:100 to 1:5.

The dispersing agent can be added to the antifoam agent by mixing with the antifoam compound or with the premix of the particulate stabilizing aid with the surfactant containing solution.

Detergent Ingredients

In another embodiment of the present invention, a liquid detergent composition is provided comprising the antifoam agent of the present invention mixed with detergent ingredients. A wide range of surfactants can be used in the detergent composition of the present invention.

A typical listing of anionic, nonionic, ampholytic and zwitterionic classes, and species of these surfactants, is given in U.S. Pat. No. 3,664,961 issued to Norris on May 23, 1972.

Mixtures of anionic surfactants are particularly suitable herein, especially mixtures of sulphonate and sulphate surfactants in a weight ratio of from 5:1 to 1:2, preferably from 3:1 to 2:3, more preferably from 3:1 to 1:1. Preferred sulphonates include alkyl benzene sulphonates having from 9 to 15, especially 11 to 13 carbon atoms in the alkyl radical, and alpha-sulphonated methyl fatty acid esters in which the fatty acid is derived from a $C_{12}$–$C_{18}$ fatty source preferably from a $C_{16}$–$C_{18}$ fatty source. In each instance the cation is an alkali metal, preferably sodium. Preferred sulphate surfactants are alkyl sulphates having from 12 to 18 carbon atoms in the alkyl radical, optionally in admixture with ethoxy sulphates having from 10 to 20, preferably 10 to 16 carbon atoms in the alkyl radical and an average degree of ethoxylation of 1 to 6. Examples of preferred alkyl sulphates herein are tallow alkyl sulphate, coconut alkyl sulphate, and $C_{14-15}$ alkyl sulphates. The cation in each instance is again an alkali metal cation, preferably sodium.

One class of nonionic surfactants useful in the present invention are condensates of ethylene oxide with a hydrophobic moiety to provide a surfactant having an average hydrophilic-lipophilic balance (HLB) in the range from 8 to 17, preferably from 9.5 to 13.5, more preferably from 10 to 12.5. The hydrophobic (lipophilic) moiety may be aliphatic or aromatic in nature and the length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol and the $C_{12}$–$C_{14}$ primary alcohols containing 3–5 moles of ethylene oxide per mole of alcohol.

Another class of nonionic surfactants comprises alkyl polyglucoside compounds of general formula

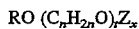

wherein Z is a moiety derived from glucose; R is a saturated hydrophobic alkyl group that contains from 12 to 18 carbon atoms; t is from 0 to 10 and n is 2 or 3; x is from 1.3 to 4, the compounds including less than 10% unreacted fatty alcohol and less than 50% short chain alkyl polyglucosides. Compounds of this type and their use in detergent are disclosed in EP-B 0 070 077, 0 075 996 and 0 094 118.

Also suitable as nonionic surfactants are poly hydroxy fatty acid amide surfactants of the formula

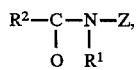

wherein $R^1$ is H, or $R^1$ is $C_{1-4}$ hydrocarbyl, 2-hydroxy ethyl, 2-hydroxy propyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is a straight $C_{11-15}$ alkyl or alkenyl chain such as coconut alkyl or mixtures thereof, and Z is derived from a reducing sugar such as glucose, fructose, maltose, lactose, in a reductive amination reaction.

The compositions according to the present invention may further comprise a builder system. Any conventional builder system is suitable for use herein including aluminasilicate materials, silicates, polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein.

Suitable builders can be an inorganic ion exchange material, commonly an inorganic hydrated aluminosilicate material, more particularly a hydrated synthetic zeolite such as hydrated zeolite A, X, B or HS.

Another suitable inorganic builder material is layered silicate, e.g. SKS-6 (Hoechst). SKS-6 is a crystalline layered silicate consisting of sodium silicate ($Na_2Si_2O_5$). Suitable polycarboxylates builders for use herein include citric acid, preferably in the form of a water-soluble salt, derivatives of succinic acid of the formula R—CH(COOH)CH2(COOH) wherein R is C10–20 alkyl or alkenyl, preferably C12–16, or wherein R can be substituted with hydroxyl, sulfo sulfoxyl or sulfone substituents. Specific examples include lauryl succinate, myristyl succinate, palmiryl succinate2-dodecenylsuccinate, 2-tetradecenyl succinate. Succinate builders are preferably used in the form of their water-soluble salts, including sodium, potassium, ammonium and alkanolammonium salts.

Other suitable polycarboxylates are oxodisuccinates and mixtures of tartrate monosuccinic and tartrate disuccinic acid such as described in U.S. Pat. No. 4,663,071.

Especially for the liquid execution herein, suitable fatty acid builders for use herein are saturated or unsaturated C10–18 fatty acids, as well as the corresponding soaps. Preferred saturated species have from 12 to 16 carbon atoms in the alkyl chain. The preferred unsaturated fatty acid is oleic acid. Another preferred builder system for liquid compositions is based on dodecenyl succinic acid.

Other suitable water-soluble organic salts are the homo- or co-polymeric acids or their salts, in which the polycarboxylic acid comprises at least two carboxyl radicals separated from each other by not more than two carbon atoms.

Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 10% to 80% by weight of the composition preferably from 20% to 70% and most usually from 30% to 60% by weight.

Other components used in detergent compositions may be employed, such enzymes and stabilizers or activators therefore, soil-suspending agents soil-release agents, optical brighteners, abrasives, bactericides, tarnish inhibitors, coloring agents, and perfumes.

Preferably, the liquid detergent compositions according to the present invention can also be in "concentrated form", in such case, the liquid detergent compositions according to the present invention will contain a lower amount of water, compared to conventional liquid detergents.

Typically, the water content of the concentrated liquid detergent is less than 30%, more preferably less than 20%, most preferably less than 10% by weight of the detergent composition.

The following examples are meant to exemplify compositions of the present inventions, but are not necessarily meant to limit the scope of the invention.

Test procedure

To assess the stability effect of the added particulate stabilizing aid, the particle size distribution of the samples were measured after several levels of storage at 21° C.

The stability of the antifoam compounds incorporated in liquid detergent compositions are compared in the absence and presence of the particulate stabilizing aid. More in particular, the stability of polydimethyl siloxane/fumed silica was determined in the absence of Aerosil and in the presence of Aerosil.

The following liquid detergent compositions were made (Table I).

Antifoam compositions prepared in accordance with the present invention were prepared and tested in order to demonstrate their defoaming capabilities and to determine stability and performance of the antifoam compositions.

The compositions of the present invention were tested in a concentrated liquid detergent.

The following concentrated liquid detergent compositions were made: (see TABLE I)

TABLE 1

| Concentrated detergent compositions | |
|---|---|
|  | I |
| $C_{12}$–$C_{15}$ Alkyl sulfate | 19.0 |
| $C_{12}$–$C_{15}$ Alkyl ethoxylated sulfate | 4.0 |
| $C_{12}$–$C_{14}$ N-methyl glucamide | 9.0 |
| $C_{12}$–$C_{14}$ fatty alcohol ethoxylate | 6.0 |
| $C_{12}$–$C_{16}$ Fatty acid | 6.8 |
| Brightener FWA-36 |  |
| Polyvinyl pyrrolidone | 1.0 |
| Citric acid anhydrous | 4.5 |
| Phosphonic acid | 1.0 |
| Monoethanolamine | 12.7 |
| Propanediol | 14.5 |
| Ethanol | 1.8 |
| Enzymes | 2.4 |
| Terephtalate-based polymer | 0.5 |
| Boric acid | 2.4 |
| Water & Minors | up to 100% |

The above compositions (Table I) were supplemented by the foam controlling agents of Table II. The composition of the foam controlling agents were prepared by premix of a surfactant containing solution having as a surfactant a non-ionic surfactant and the Aerosil premixed before mixing with the polydimethylsiloxane/silica mixture. The antifoam agent was then added to the liquid detergent compositions.

|  | Percentage by weight of the total detergent composition | |
|---|---|---|
| Ingredients | A | B |
| Polydimethylsiloxane/silica | 0.8 | 0.8 |
| Surfactant-containing solution (nonionic 99.9%, <0.1% water) | 1.5 | 1.5 |
| Aerosil[R] | 0 | 0.08 |
|  | C | D |
| Polydimethylsiloxane/silica | 0.4 | 0.4 |
| Surfactant-containing solution (nonionic 99.9%, <0.1% water) | 0.32 | 0.32 |
| Aerosil[R] | 0 | 0.04 |

Results:

No visual separation of the silicone antifoam compound was found for the detergent compositions formulated according to formula B and D over periods longer than 1 month, whereas the detergent compositions according to formula A and C showed visual separation of the silicone antifoam compound in less than 1 week.

What is claimed is:

1. An antifoam agent suitable for incorporation as a composition into liquid detergent products, which antifoam agent comprises:

A) from 0.1% to 80% by weight of the antifoam agent composition of a silicone antifoam admixture which comprises a polydimethylsiloxane antifoam compound mixed with from 1 to 30% by weight of a completely said admixture of hydrophobic silanated silica particles and which has a viscosity of from $2 \times 10^{-4}$ $m^2/s$ to 1 $m^2/s$;

B) a surfactant-containing solution which comprises from 80% to 100% by weight of said solution of a nonionic surfactant and which is present in a weight ratio to the silicone antifoam admixture of from 1:4 to 1000:1; and C) a particulate stabilizing aid which comprises fumed or precipitated silica having a BET surface area of from 50 to 500 $m^2/g$, which has been hydrophobically modified so as to have a Methanol Wettability of from 30% to 70% and said silica contains about 30% hydrophilic groups, and which is present in a weight ratio to the silicone antifoam admixture of from 1:200 to 1:1.

2. An antifoam agent according to claim 1 wherein said nonionic surfactant is an ethoxylated nonionic surfactant.

3. An antifoam agent according to claim 1 wherein said particulate stabilizing aid is fumed non-porous silica.

4. An antifoam agent according to claim 1 further comprising a dispersant present in a weight ratio to the silicone antifoam admixture of from 1:100 to 1:5.

5. A liquid detergent composition comprising from 0.01% to 20% by weight of the antifoam agent according to claim 1.

6. A liquid detergent composition according to claim 5 comprising up to about 45% by weight of additional surfactants, and from 10% to 80% by weight of builders.

7. A process for making an antifoam agent according to claim 1 comprising the steps of:

(a) premixing the nonionic surfactant-containing solution with the particulate stabilizing aid in a weight ratio of 100,000:1 to 4:1, and (b) admixing the premix so prepared with the silicone antifoam admixture wherein the weight ratio of the premix to the silicone antifoam admixture is from 1000:1 to 1:4.

* * * * *